United States Patent [19]

Hirota et al.

[11] Patent Number: 4,803,133
[45] Date of Patent: Feb. 7, 1989

[54] MAGNETIC RECORDING MEDIUM

[75] Inventors: Hozumi Hirota, Yamatokoriyama; Yukihiro Shimasaki, Katano; Hideaki Komoda, Hirakata; Ikuo Ota, Yawata, all of Japan

[73] Assignee: Matsushita Electric Industrial Co., Ltd., Osaka, Japan

[21] Appl. No.: 130,299

[22] Filed: Dec. 8, 1987

[30] Foreign Application Priority Data

Dec. 26, 1986 [JP] Japan .................................. 61-312228
Jan. 12, 1987 [JP] Japan .................................... 62-4377
Jan. 12, 1987 [JP] Japan .................................... 62-4378

[51] Int. Cl.$^4$ ............................................. G11B 5/71
[52] U.S. Cl. ..................................... 428/695; 427/128; 428/425.9; 428/522; 428/694; 428/900
[58] Field of Search ...................... 428/694, 695, 425.9, 428/900, 522; 360/134–136; 252/62, 54; 427/128

[56] References Cited

U.S. PATENT DOCUMENTS

| | | | |
|---|---|---|---|
| 4,172,176 | 10/1979 | Tanaka | 428/695 |
| 4,247,407 | 1/1981 | Naruse | 427/128 |
| 4,383,000 | 5/1983 | Fujiki | 428/522 |
| 4,383,001 | 5/1983 | Fujiki | 428/522 |
| 4,465,737 | 8/1984 | Miyatuka | 428/695 |
| 4,551,386 | 11/1985 | Yamaguchi | 428/694 |
| 4,601,946 | 7/1986 | Iida | 428/408 |
| 4,645,724 | 2/1987 | Ojima | 428/695 |
| 4,696,859 | 9/1987 | Miyoshi | 428/695 |
| 4,713,293 | 12/1987 | Asano | 428/403 |

*Primary Examiner*—Ellis P. Robinson
*Attorney, Agent, or Firm*—Wenderoth, Lind & Ponack

[57] ABSTRACT

A magnetic recording medium characterized in that a magnetic layer composed of the combination of oleic acid and ester, whereby it is better in the lubricating characteristics of the magnetic layer and in the abrasion resisting property of the magnetic layer, and superior in the durability in a wide temperature range.

1 Claim, No Drawings

MAGNETIC RECORDING MEDIUM

BACKGROUND OF THE INVENTION

The present invention relates to a magnetic recording medium, and more particularly, to a magnetic recording medium which is used in the high-density records such as digital audio-tape, high picture-quality video tape, high-density floppy disc, etc., and is better in lubricating characteristics and superior in durability.

Conventionally, the coating material composed of magnetic powder, binder resin, organic solvent and other necessary components is applied on a base body such as polyester film or the like to produce a magnetic recording medium. In the practical use, the magnetic layer is likely to be worn away because of hard sliding with the magnetic head, the pad, etc. Thus, superior lubricating property on the surface, less wear property of the magnetic layer, and high durability are desired.

In order to improve the durability of the magnetic recording medium, various lubricating agents are mixed with the magnetic layer or are coated on it. Generally, liquid paraffin, high-class fatty acids and, ester of the high-class fatty acids, etc. are used as these lubricating agents.

For example, U.S. Pat. No. 654,258 discloses magnetic recording medium including fatty-acid ester and fatty-acid amide as the lubricating agent. U.S. Pat. No. 4,595,640 discloses a lubricating agent system composed of carboxylic-acid isomer and fatty-acid ester to provide a video tape which is longer in the service life of still picture operation. Also, U.S. Pat. No. 4,647,502 discloses that the ester of unsaturated high-class fatty acid and alcohol of 6 through 16 in the number of carbons is preferred as the lubricating agent in the case of the magnetic disc. Also, for example, U.S. Pat. No. 4,650,720 uses oleic acid as such a lubricating agent.

However, these conventional lubricating agents improve the durability of the magnetic recording medium, but were not sufficient in characteristics. Also, it was difficult to provide superior lubricating characteristics over a wide temperature range.

SUMMARY OF THE INVENTION

Accordingly, an essential object of the present invention is to provide a magnetic recording medium which is better in the lubricating characteristics of the magnetic layer, and is superior in the durability.

Another object of the present invention is to provide a magnetic recording medium which is better in the abrasion resisting property of the magnetic layer and superior in the durability in a wide temperature range.

Still another object of the present invention is to provide a magnetic recording medium which is superior in the durability and abrasion resistance by the use of a new lubricating-agent system composed of the combination of oleic acid and ester.

In accomplishing these and other objects, according to the present invention, there is provided a magnetic recording medium, which has on the support body a magnetic layer containing oleic acid, a first ester selected from ethyl stearate and ethyl oleate, and second ester selected from isocetyl stearate, 2-ethyl hexyl stearate and 2-ethyl hexyl laurate. The above-described construction has an effect of being better in the abrasion resistance thereof over a wide temperature range.

DETAILED DESCRIPTION OF THE INVENTION

Oleic acid used in the present invention is unsaturated fatty acid in liquid state at the room temperature of 18 in the number of carbons, and is superior in lubricating function. Especially, when the magnetic layer is in sliding contact against a magnetic head, the superior lubricating function is sufficiently exhibited to improve the durability of the magnetic layer. Also, when ethyl stearate or ethyl oleate and isocetyl stearate, 2-ethyl hexyl laurate or 2-ethyl hexyl stearate are jointly used, the lubricating functions of the above-described three materials multiplicatively work to further improve the lubricating characteristics and abrasion resistance of the magnetic layer.

The ethyl stearate or ethyl oleate is the first ester jointly used with oleic acid in the present invention. It is ester which is provided by the ethyl alcohol of 2 in the number of carbons, and the stearic acid of 18 in the number of carbons of the oleic acid. The ester has a lubricating function stable over a wide temperature range. On the other hand, the isocetyl stearate, which is the second ester, is ester provided by the isocetyl alcohol of 16 in the number of carbons and the stearic acid of 18 in the number of carbons. The 2-ethyl hexyl laurate is ester provided by the 2-ethyl hexyl alcohol of 8 in the number of carbons and the lauric acid of 12 in the number of carbons. Also, the 2-ethyl hexyl stearate is the ester provided by the 2-ethyl hexyl alcohol of 8 in the number of carbons and the stearic acid of 18 in the number of carbons. They are superior in the lubricating effect at low temperatures. They work multiplicatively, when they are jointly used with oleic acid, to further improve the abrasion-resistance of the magnetic layer, so that the lubricating characteristics and abrasion resisting property are sufficiently improved at the wide temperature range.

The compounding ratio of the oleic acid and the total ester, i.e., the total amount of the first ester and the second ester, is desirable to stay from 1:2 to 1:8 ratio in range by weight. When the lubricating agents jointly used are respectively less than the compounding ratio, the abrasion resisting property of the magnetic layer is not sufficiently improved. Especially, when the compounding ratio of the ester amount is less, the abrasion resisting property at a high temperature is not improved.

Also, when the compounding ratio of the oleic acid is more, the friction coefficient against the pad becomes higher to make the running operation unstable. When the compounding ratio of the ester is more, it bleeds out onto the surfaces of the magnetic layer to spoil the head, thus resulting in lowering the output and abrasion-resisting property through the pad.

The using amount of the first ester, the second ester and the oleic acid blended at such compounding ratio as described hereinabove is desirable to stay within 5 through 10% in total weight with respect to the magnetic powder. When it is less, the expected effect is not provided. When it is more, it bleeds out onto the surface of the magnetic layer to spoil the magnetic head, thus resulting in lowering the output.

In order to contain the oleic acid and the first and second esters in the magnetic layer, it is necessary to dissolve them into proper solvent such as normal hexane or the like and to apply or spray the solution, provided by the resolution, on the magnetic layer formed in advance or to dip the magnetic layer in the solution or to mix them with the magnetic powder and binder resin to form the magnetic layer.

The present invention will be described hereinafter in conjunction with the preferred embodiments thereof.

EMBODIMENT 1

| | |
|---|---|
| oleic acid | 2 parts by weight |
| magnetic powder | 250 parts by weight |
| VAGH (vinyl chloride acetate-vinyl alcohol copolymer, manufactured by UCC Company, USA) | 82 parts by weight |
| N-2304 (polyurethane, manufactured by Nippon Polyurethane Industry) | 18 parts by weight |
| Coronate L (polyisocynate, manufactured by Nippon Polyurethane Industry) | 7.5 parts by weight |
| granular aluminum | 12.5 parts by weight |
| carbon black | 15 parts by weight |
| methyl ethyl ketone | 500 parts by weight |
| toluene | 500 parts by weight |

The composition is mixed, dispersed in a ball mill to adjust the magnetic coating material. The magnetic coating material is applied iupon both faces of the polyester film of 75 microns in thickness so that the dry thickness may become 2 microns and is after-dried to form the magnetic layer. Then, it is dipped for a short time in an impregnation solution having composition ratios shown in Table 1 below. After the drying operation, it is stamped out into a disc shape to provide magnetic discs.

TABLE 1

| | Impregnation Solution Composition | | |
|---|---|---|---|
| Samples | Ethyl Stearate | Isocetyl Stearate | n-hexane |
| A | 8 parts | 2 parts | 100 parts |
| B | 4 parts | 4 parts | 100 parts |
| C | 3 parts | 8 parts | 100 parts |
| D | 2 parts | 7 parts | 100 parts |
| E | 2 parts | 8 parts | 100 parts |

EMBODIMENT 2

The oleic acid, the ethyl stearate and the isocetyl stearate in ratio of 1:1:3.5 by weight and in total weight of 8% to the magnetic powder, are mixed with the magnetic powder and the binder resin to produce the magnetic coating material. The magnetic disc is produced in the same manner as that of embodiment 1, except for the dipping operation in the impregnation solution, with the thus obtained coating material.

EMBODIMENT 3

In the impregnation solution composition of embodiment 1, ethyl oleate, instead of ethyl stearate, is used as the first ester, and 2-ethyl hexyl laurate, instead of the isocetyl stearate of the second ester, is used. The magnetic disc is produced, with the composition ratio and the process for producing the magnetic coating-material being the same as that of embodiment 1.

EMBODIMENT 4

The ratio of the oleic acid, the ethyl oleate and 2-ethyl hexyl laurate in ratio of 1:1:3.5 by weight and in the total weight of 8% to the magnetic powder, are mixed with the magnetic powder and the binder resin to produce the magnetic coating material. The magnetic disc is produced in the same manner as that of embodiment 1 except for the dipping operation in the impregnation solution.

EMBODIMENT 5

In the impregnation solution composition of embodiment 1, the ethyl stearate was used likewise as the first ester, and the 2-ethyl hexyl stearate, instead of isocetyl stearate, is used as the second ester. Then, the magnetic disc is produced in the same manner as that of embodiment 1.

EMBODIMENT 6

The ratio of the oleic acid, the ethyl stearate and the 2-ethyl hexyl stearate in ratio of 1:1:3.5 by weight and in the total weight of 8% to the magnetic material, are mixed with the magnetic powder and the binder resin to produce the magnetic coating material. The magnetic disc is produced in the same manner as that of embodiment 1 except for the dipping operation in the impregnation solution.

COMPARISON EMBODIMENT 1

In the blended composition of the fatty acid and the esters in embodiment 2, the oleic acid is changed into lecithin, ethyl stearate is changed into n-butyl stearate, and the isocetyl stearate is changed into dioleyl adipate, equivalently, respectively. Then, the magnetic disc is produced in the same manner as that of embodiment 2.

In order to check the durability, at the room temperature and high and low temperatures, about the magnetic disc provided in each embodiment and each comparison embodiment, each magnetic disc is inserted into a jacket for spoil-preventing use, and is filled into the record reproducing apparatus. Then, the running time while the reproduction output becomes 80% of the initial output is measured, at the contact of the magnetic head and the disc with the pad pressure of 25 g/cm$^2$ under each of the conditions of 0° C. through 50° C. Table 2 shows the results thereof.

TABLE 2

| Samples | Running time (hour) at 0° C. | Running time (hour) at room temperature | Running time (hour) at 50° C. |
|---|---|---|---|
| Embodiment 1 A | 245 | 237 | 187 |
| Embodiment 1 B | 377 | 357 | 286 |
| Embodiment 1 C | 432 | 398 | 415 |
| Embodiment 1 D | 498 | 476 | 457 |
| Embodiment 1 E | 376 | 352 | 318 |
| Embodiment 2 | 492 | 413 | 425 |
| Embodiment 3 A | 226 | 219 | 172 |
| Embodiment 3 B | 348 | 329 | 264 |
| Embodiment 3 C | 398 | 367 | 382 |
| Embodiment 3 D | 459 | 438 | 421 |
| Embodiment 3 E | 347 | 324 | 293 |
| Embodiment 4 | 453 | 380 | 392 |
| Embodiment 5 A | 235 | 228 | 179 |
| Embodiment 5 B | 362 | 343 | 275 |
| Embodiment 5 C | 415 | 382 | 398 |
| Embodiment 5 D | 478 | 457 | 439 |
| Embodiment 5 E | 361 | 338 | 305 |
| Embodiment 6 | 472 | 396 | 408 |
| Comparison Embodiment 1 | 138 | 198 | 108 |

EMBODIMENT 7

The magnetic layer formed in embodiment 1 is dipped for a short time in the impregnation solution having the composition ratio shown in Table 3 below.

After the drying operation, it is stamped out into disc shape to provide the magnetic disc.

TABLE 3

| Samples | Impregnation Solution Composition | | |
|---|---|---|---|
| | Ethyl Oleate | Isocetyl Stearate | n-hexane |
| A | 8 parts | 2 parts | 100 parts |
| B | 4 parts | 4 parts | 100 parts |
| C | 3 parts | 8 parts | 100 parts |
| D | 2 parts | 7 parts | 100 parts |
| E | 2 parts | 8 parts | 100 parts |

EMBODIMENT 8

The ratio of the oleic acid, the ethyl oleate and the isocetyl stearate in ratio of 1:1:3.5 by weight and in the total weight of 8% to the magnetic powder, are mixed with the magnetic powder and the binder resin to produce the magnetic coating material. The magnetic disc is produced in the same manner as that of embodiment 1 except for the dipping operation in the impregnation solution.

EMBODIMENT 9

The magnetic layer formed in embodiment 1 is dipped for a short time in the impregnation solution having the composition ratio shown in Table 4 below. After the drying operation, it is stamped out into disc shape to provide the magnetic disc.

TABLE 4

| Samples | Impregnation Solution Composition | | |
|---|---|---|---|
| | Ethyl Stearate | 2-Ethyl hexyl laurate | n-hexane |
| A | 8 parts | 2 parts | 100 parts |
| B | 4 parts | 4 parts | 100 parts |
| C | 3 parts | 8 parts | 100 parts |
| D | 2 parts | 7 parts | 100 parts |
| E | 2 parts | 8 parts | 100 parts |

EMBODIMENT 10

The ratio of oleic acid, ethyl stearate and 2-ethyl hexyl laurate in ratio of 1:1:3.5 by weight and in the total weight of 8% to the magnetic powder, are mixed with the magnetic powder and the binder to produce the magnetic coating material. The magnetic disc is produced in the same manner as that of embodiment 1 except for the dipping operation in the impregnation solution.

EMBODIMENT 11

The magnetic layer formed in embodiment 1 is dipped for a short time in the impregnation solution having the composition ratio shown in Table 5 below. After the drying operation, it is stamped out into disc shape to provide the magnetic disc.

TABLE 5

| Samples | Impregnation Solution Composition | | |
|---|---|---|---|
| | Ethyl Oleate | 2-Ethyl hexyl Stearate | n-Hexane |
| A | 8 parts | 2 parts | 100 parts |
| B | 4 parts | 4 parts | 100 parts |
| C | 3 parts | 8 parts | 100 parts |
| D | 2 parts | 7 parts | 100 parts |
| E | 2 parts | 8 parts | 100 parts |

EMBODIMENT 12

The ratio of oleic acid, ethyl stearate and 2-ethyl hexyl stearate in ratio of 1:1:3.5 by weight and in the total weight of 8% to the magnetic powder, are mixed with the magnetic powder and the binder resin to produce the magnetic coating material. The magnetic disc is produced in the same manner as that of embodiment 1 except for the dipping operation in the impregnation solution.

COMPARISON EMBODIMENT 2

In the blended composition of the fatty acid and the esters in embodiment 8, the oleic acid is changed into lecithin, ethyl oleate is changed into n-butyl stearate, and isocetyl stearate is changed into dioleyl adipate equivalently, respectively. Then, the magnetic disc is produced in the same method as that of embodiment 8.

Even in the magnetic disc provided in the abovedescribed embodiments and comparison embodiments, each magnetic disc is likewise inserted into a jacket for spoil preventing use, and is filled into the record reproducing apparatus to measure the running time while the reproduction output becomes 80% of the initial output, at the contact of the magnetic head and the disc with the pad pressure of 25 g/cm$^2$ under each of the conditions of 0° C. through 50° C. Table 6 shows the results thereof.

TABLE 6

| Samples | Running time (hour) at 0° C. | Running time (hour) at room temperature | Running time (hour) at 50° C. |
|---|---|---|---|
| Embodiment 7 A | 267 | 261 | 206 |
| Embodiment 7 B | 414 | 393 | 315 |
| Embodiment 7 C | 475 | 438 | 456 |
| Embodiment 7 D | 548 | 526 | 503 |
| Embodiment 7 E | 413 | 387 | 349 |
| Embodiment 8 | 541 | 454 | 467 |
| Embodiment 9 A | 244 | 237 | 186 |
| Embodiment 9 B | 376 | 357 | 286 |
| Embodiment 9 C | 432 | 397 | 414 |
| Embodiment 9 D | 497 | 475 | 457 |
| Embodiment 9 E | 375 | 352 | 317 |
| Embodiment 10 | 491 | 412 | 423 |
| Embodiment 11 A | 235 | 228 | 179 |
| Embodiment 11 B | 362 | 343 | 275 |
| Embodiment 11 C | 415 | 382 | 398 |
| Embodiment 11 D | 478 | 457 | 439 |
| Embodiment 11 E | 361 | 338 | 305 |
| Embodiment 12 | 472 | 396 | 408 |
| Comparison Embodiment 2 | 138 | 198 | 108 |

As is clear from the foregoing description, according to the present invention, the magnetic discs provided in the embodiments are longer in the running time at 0° C. through 50° C. as compared with the magnetic discs provided in the comparison embodiments.

As described hereinabove, according to the present invention, the magnetic recording mediums are provided which are superior in abrasion resistance property of the magnetic layer and superior in durability in the wide temperature range. In the above-described embodiment 1, the composition with oleic acid being blended from the beginning is dispersed in the ball mill to improve the dispersion effect. For example, in the so-called high viscosity dispersion by a planetary mixer, the coating material is produced without the oleic acid, and the oleic acid is contained in the impregnation solution, so that the same effect may be provided.

What is claimed is:

1. A magnetic recording medium comprising a support body and a magnetic layer formed on the support body, said magnetic layer including magnetic powder, oleic acid and a first ester selected from a group consisting of ethyl stearate and ethyl oleate, and a second ester selected from a group consisting of isocetyl stearate, 2-ethyl hexyl stearate and 2-ethyl hexyl laurate, wherein the compounding ratio of the oleic acid and the total amount of the first and second esters is 1:2 to 1:8 by weight, and the total amount of the oleic acid, the first ester and the second ester is 5 to 15% by weight with respect to the magnetic powder.

* * * * *